(12) United States Patent
Shepherd et al.

(10) Patent No.: US 10,882,195 B2
(45) Date of Patent: Jan. 5, 2021

(54) METHOD FOR MAKING A SOFT ACTUATOR DEVICE

(71) Applicant: Cornell University, Ithaca, NY (US)

(72) Inventors: Robert Shepherd, Brooktondale, NY (US); Huichan Zhao, Ithaca, NY (US); Ahmed Elsamadisi, Sunnyside, NY (US)

(73) Assignee: Cornell University, Ithaca, NY (US)

( * ) Notice: Subject to any disclaimer, the term of this patent is extended or adjusted under 35 U.S.C. 154(b) by 653 days.

(21) Appl. No.: 15/030,501

(22) PCT Filed: Oct. 22, 2014

(86) PCT No.: PCT/US2014/061762
§ 371 (c)(1),
(2) Date: Apr. 19, 2016

(87) PCT Pub. No.: WO2015/061444
PCT Pub. Date: Apr. 30, 2015

(65) Prior Publication Data
US 2016/0250758 A1    Sep. 1, 2016

Related U.S. Application Data

(60) Provisional application No. 61/894,774, filed on Oct. 23, 2013, provisional application No. 61/894,415, filed on Oct. 22, 2013.

(51) Int. Cl.
| B29C 41/20 | (2006.01) |
| B25J 19/00 | (2006.01) |
| B25J 9/14 | (2006.01) |
| B25J 9/10 | (2006.01) |
| B25J 9/00 | (2006.01) |
| B29C 41/06 | (2006.01) |
| B29C 41/00 | (2006.01) |
| B29C 41/08 | (2006.01) |

(Continued)

(52) U.S. Cl.
CPC .......... *B25J 19/007* (2013.01); *B25J 9/0006* (2013.01); *B25J 9/0012* (2013.01); *B25J 9/1075* (2013.01); *B25J 9/142* (2013.01); *B29C 41/003* (2013.01); *B29C 41/04* (2013.01); *B29C 41/06* (2013.01); *B29C 41/085* (2013.01); *B29C 41/20* (2013.01); *B29K 2075/00* (2013.01); *B29K 2083/005* (2013.01); *B29K 2105/12* (2013.01); *B29K 2221/003* (2013.01); *B29K 2277/00* (2013.01); *B29L 2022/00* (2013.01); *F15B 2215/305* (2013.01)

(58) Field of Classification Search
None
See application file for complete search history.

(56) References Cited

U.S. PATENT DOCUMENTS

| 3,695,582 A | 10/1972 | Clay |
| 2011/0046729 A1* | 2/2011 | Schuessler .............. B29C 41/04 623/8 |
| 2013/0053984 A1 | 2/2013 | Hunter |

FOREIGN PATENT DOCUMENTS

WO    2012148472    11/2012

* cited by examiner

*Primary Examiner* — Edmund H Lee
(74) *Attorney, Agent, or Firm* — Hodgson Russ LLP

(57) ABSTRACT

By rotationally casting soft robots, no bonding of different material layers is required. Soft robots including one or more integrated enclosed compartments are constructed from fibers that are embedded directly into the mold prior to adding elastomeric precursors.

11 Claims, 7 Drawing Sheets

(51) Int. Cl.
  *B29C 41/04* (2006.01)
  *B29K 83/00* (2006.01)
  *B29K 277/00* (2006.01)
  *B29K 221/00* (2006.01)
  *B29K 105/12* (2006.01)
  *B29K 75/00* (2006.01)
  *B29L 22/00* (2006.01)

300

600

METHOD FOR MAKING A SOFT ACTUATOR DEVICE

CROSS-REFERENCE TO RELATED APPLICATIONS

This application claims the benefit of U.S. Provisional Patent Application No. 61/894,415 filed Oct. 22, 2013 and U.S. Provisional Patent Application No. 61/894,774 filed Oct. 23, 2013, which is incorporated by reference.

FIELD OF THE INVENTION

The invention relates to generally to robots. More specifically, the invention relates to soft robots and fabrication using rotational casting.

BACKGROUND OF THE INVENTION

In areas from assembly of machines to surgery, and from deactivation of improvised explosive devices (IEDs) to unmanned flight, robotics is an important and rapidly growing field of science and technology. It is currently dominated by robots having hard body plans—constructions largely of metal structural elements and conventional joints—and actuated by electrical motors, or pneumatic or hydraulic systems. Handling fragile objects—from the ordinary (fruit) to the important (internal organs)—is a frequent task whose importance is often overlooked and is difficult for conventional hard robots; moving across unknown, irregular, and shifting terrain is also difficult for conventional hard robots.

Soft robots may provide solutions to both of these classes of problems, and to others. The robotics community defines "soft robots" as including machines made of soft—often elastomeric—materials. Soft robots offer new models for manipulation and mobility not found, or generated only with difficulty and expense, using hard robots. Methods of designing and fabricating soft robots are, however, much less developed than those for hard robots. There is a desire to expand the methods and materials of chemistry and soft-materials science into applications in fully soft robots.

Soft robots are emerging as a new component in robotics that allow for simpler operation of complex functions such as robotic manipulators, more natural motions, and new functions such as climbing walls. In many cases, these machines are actuated by pneumatically powered balloons composed of organic elastomers that increases inflated pressure resulting in greater stiffness and shape change. At low or zero inflation pressures, these actuator devices present low stiffness and allow unconstrained movement as wearable devices and human interfaces. As a result, there is a growing effort to use soft actuator devices for exoskeletons and prosthetics that can augment the force of, or altogether replace, human grasping and locomotion, as well as perform physical therapy tasks. To fully realize the fabrication of these machines, complex actuator device geometries, for example sleeves and gloves, that can apply a large range of forces is necessary.

Materials from which this class of devices are fabricated usually includes polymers, especially elastomers, they fall into the realm of organic materials science. The use of soft materials allows for continuous deformation. This type of deformation, in turn, enables structures with ranges of motion limited only by the properties of the materials.

Soft robots have the potential to exploit types of structures found, for example, in marine organisms, and in non-skeletal parts of land animals. The tentacles of squid, trunks of elephants, and tongues of lizards and mammals are such examples; their structures are muscular hydrostats. Squid and starfish are highly adept locomotors; their modes of movement have not been productively used, and permit solutions of problems in manipulation, locomotion, and navigation, that are different from those used in conventional hard robotics.

The prototypical soft actuator device known as "muscle" was developed through the course of evolution. There is currently no technology that can replicate the balanced performance of muscle. It is simultaneously strong and fast, and enables a remarkable range of movements such as those of a tongue. Muscle-like contraction and dilation occur in ionic polymeric gels on changes in the acidity or salinity of a surrounding ionic solution, but actuations in macroscopic structures is mass-transport limited and typically slow. Other electroactive polymers (EAPs) include dielectric elastomers, electrolytically active polymers, polyelectrolyte gels, and gel-metal composites.

The McKibben muscle is a fiber-reinforced soft actuator device capable of large ranges of stiffness as a function of pressure. Pneumatically-driven McKibben-type actuator devices are among the most highly developed soft actuator devices, and have existed for more than fifty years. These types of actuator devices consist of a bladder covered in a shell of braided, strong, inextensible fibers. These actuator devices can be fast, and have a length-load dependence similar to that of muscle, but possess only one actuation mode—contraction and extension when pressurization changes. They are, in a sense, an analogue to a single muscle fibril. Using them for complex movements requires multiple actuator devices acting in series or parallel. One example of a McKibben-type actuator is known as Fluidic Muscle DMSP that can apply pressure from 0 to ~830 kilopascals (kPa) (~130 pounds per square inch (psi)). This actuator device, however, is limited as it has only one mode of powered actuation: contraction.

Pneumatically-driven flexible microactuator devices (FMAs) have been shown to be capable of bending, gripping, and manipulating objects. Scalable methods for gripping and manipulating objects have been explored at the micro and nano-scales. The use of compliant materials allows grippers to manipulate objects such as fruit with varied geometry.

Other soft actuator devices that are under development have many modes of actuation (bending, extending, and contracting) but are fabricated laboriously, either by replica molding and gluing layers together or fiber winding. Furthermore, the available architectures for these actuator devices are limited as replica molding is essentially a 2D process and fiber winding is practical in only very simple actuator device designs. Additionally, replica molded actuator devices function by the expansion of thin elastomer membranes that burst at low pressures for the current choices of material (~15 psi; ~100 kPa), and on glued layers that easily delaminate. For many future applications of soft actuator devices (e.g., prosthetics or therapeutic and surgical tools), mass production is necessary.

The field of robotics has not yet caught the full attention of soft-materials scientists and chemists. Developing new materials, techniques for fabrication and principles of design create new types of soft robots. However, pneumatic actuator devices have been developed using a replica molding technique similar to soft lithography. First, a rubber precursor (typically silicone) is poured onto a negative relief pattern of channels then polymerized into the viscoelastic rubber. The patterned rubber is then peeled out of the mold and glued to a second layer that bonds/seals the actuator devices. After the actuator devices are sealed, they can be pressurized with fluids—gas, liquids—and the resulting pressure differential causes the top layer to stretch, while the bottom layer does not due to differences in stiffness of the elastomers. However, these actuator devices bend. In addition, if the pressure differential is too high, then the glued layers delaminate and the actuator devices are irreversibly damaged and fail to function. The commercial use of these actuator devices requires they be reliable and, in some applications such as prosthetics or assisting locomotion, apply large forces. Unfortunately, larger pressure differentials such as those greater than approximately 15 psi and large numbers of actuation cycles cause the bonded layers to delaminate and fail.

Thus, there is a need for durable actuator devices that can withstand increased pressure and delamination caused by inflation. The invention satisfies this need.

SUMMARY OF THE INVENTION

The invention meets the needs of complex actuator device design, applying large forces, and scalable fabrication. More specifically, rotational casting is used to fabricate pneumatically powered, monolithic soft actuator devices.

The invention introduces fabrication of actuator devices that require no gluing or lamination. More specifically, the actuator devices are monolithic, or made from only one material. Actuator devices contain no bonding sites and no boding of layers is required. As the resulting actuator devices have no seams, they fail due to ultimate strength of the materials (or flaws therein) and not due to assembly errors. As a result, they can attain high pressure and apply relatively large forces.

According to the invention, rotational casting is used to case the entire actuator device at one time; however wax molds that melt away are also contemplated. Rotational molds may be driven by gravity, not centrifugal force, to enable multiple molds used during a single run. Using gravity driven rotational molds facilitates mass-production that can be easily realized.

Compared with traditional rotational casting, one advantage of the invention is that it is applicable to the curing process of RTV (room temperature vulcanizing) elastomers (e.g., Ecoflex 00-30) which is a common material used for soft robots. Additionally, the invention dramatically simplifies the process, no heating or cooling phases are needed. Furthermore, the invention can potentially use a wide range of materials such as urethanes, acrylates, styrene-butadiene rubbers.

The actuator devices according to the invention can tolerate much greater pressures before failing in comparison to existing actuator devices. Specifically, actuator devices according to the invention can withstand 30-50 psi, without failing. It is also contemplated that the actuator devices according to the invention survive millions of cycles without failing. Furthermore, actuator devices according to the invention are capable of applying significant force while actuated.

The invention demonstrates a type of design that provides a range of behaviors, and offers a test bed for new materials and methods of fabrication for soft robots. For purposes of this application, the invention is discussed in reference to soft robots in the form of soft actuator devices, but the discussion is not limiting and is merely exemplary since any soft robot is contemplated.

The invention and its attributes and advantages will be further understood and appreciated with reference to the accompanying drawings.

BRIEF DESCRIPTION OF THE DRAWINGS

The preferred embodiments of the invention will be described in conjunction with the appended drawings provided to illustrate and not to the limit the invention, where like designations denote like elements, and in which.

DETAILED DESCRIPTION

According to one embodiment of the invention, a soft robot is fabricated from an elastomer material and comprises one or more integrated enclosed compartments such as channels and/or chambers that inflate when pressurized, creating motion. The nature of this motion is controlled by modifying the geometry of the integrated enclosed compartments and the material properties of their walls.

Figure 1:
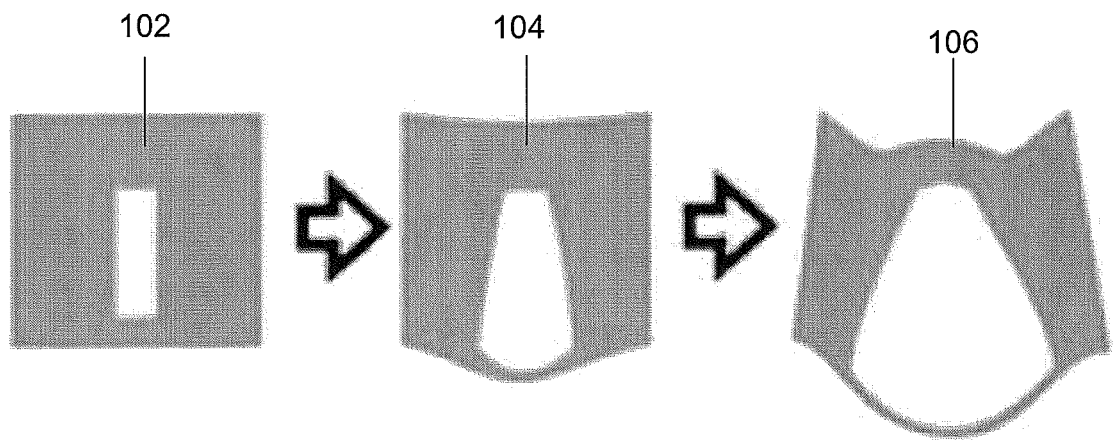
FIG. 1 is an illustration the deformation of an integrated enclosed compartment according to one embodiment of the invention.

FIG. 1 is an illustration 100 of the deformation of an integrated enclosed compartment according to one embodiment of the invention. As shown by 102, the integrated enclosed compartment is at atmospheric pressure. When pressurized, the integrated enclosed compartment expands in the regions that are most compliant or have the lowest stiffness as shown by 104. In homogeneous elastomers, such regions are those defined by the thinnest walls (i.e., by the structure with the lowest resistance to stretching). Pressurization and expansion in these regions further thins the walls, and increases the volume of the integrated enclosed compartment as shown by 106. To accommodate the asymmetric elongation of two opposite walls of the integrated enclosed compartments, the structure surrounding the expanding volume bends. For example, upon pressurization, a single integrated enclosed compartment spanning the length of a rectangular slab causes the slab to bend around the axis of the integrated enclosed compartment. Multiple integrated enclosed compartments have an additive effect;

upon pressurization, an actuated network of channels can generate complex shapes in elastomeric structures. For one or more integrated enclosed compartments formed in a uniform materials, upon pressurization, the portion that has the thinnest wall expands first, as it requires the least amount of force (or pressure) to deform. Further pressurization continues to thin that wall and consequently bends the top surface, and forms a concave shape. Therefore, the behavior of the actuator device can be pre-programmed by selecting wall thicknesses that will result in a desired type of motion.

The choice of materials, coupled with the design of the integrated enclosed compartments, determines the response of the device to applied pressure. The pressure necessary to achieve particular amplitude of actuation scales with the stiffness of the materials.

Figure 2:
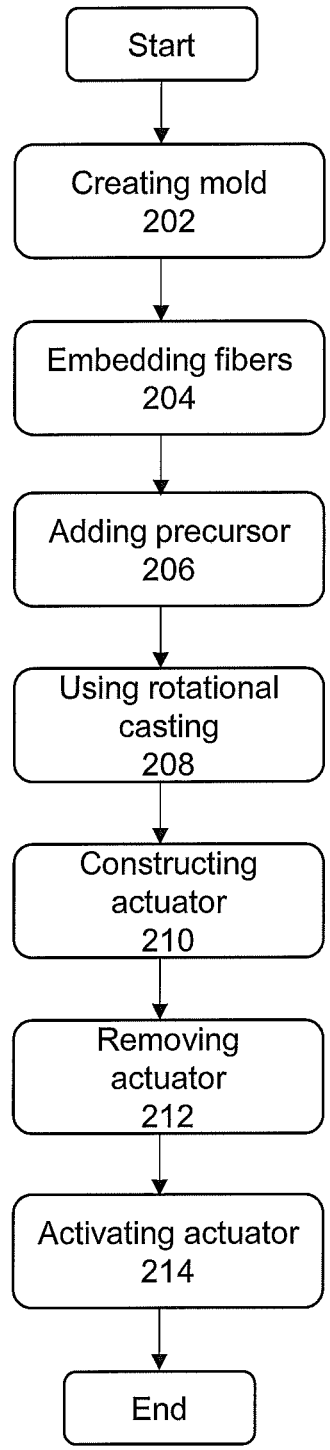
FIG. 2 is a flow chart for fabricating a soft robot according to one embodiment of the invention.

FIG. 2 is a flow chart for fabricating a soft robot according to one embodiment of the invention. At step 202 a mold is created. The invention uses rotational casting since it is an established process for high volume fabrication of hollow, monolithic structures. Since rotational casting is used, the design of the mold is based on general rotational casting criterion—for example, draft angles, melt-flow of materials, wall thickness—and soft actuator device design criterion determined by its desired function.

At step 204, fibers are embedded into the cavity of the mold. The fibers form a strain-limiting layer. In one embodiment, the fibers are nylon fibers. However, any material is contemplated, for example, saturated rubbers, thermoplastic elastomers (TPE) or any synthetic polymer.

An elastomeric precursor is added into the cavity of the mold at step 206. Elastomeric precursors include, for example, urethanes, acrylates, styrene-butadiene rubbers, more specifically, silicones such as polydimethylsiloxane, a latex or thermoset elastomer. It is also contemplated that elastomeric precursors may include. In one embodiment, the elastomeric precursor is a silicone known as Ecoflex30. In another embodiment of the invention, the elastomeric precursor is a silicone rubber known as ELASTOSIL M4601. In yet another embodiment, the elastomeric precursor is ELASTOSIL M4601 and a thinner material, which lowers the viscosities of materials.

At step 208, rotational casting is used to disperse the elastomeric precursor within the cavity of the mold. Rotational casting involves a hollow mold which is filled with material. The mold is then slowly rotated (usually around two perpendicular axes) causing the softened material to disperse and stick to the walls of the mold. In order to maintain even thickness throughout the part, the mold continues to rotate.

At step 210, the soft actuator device is constructed. The soft actuator device includes one or more integrated enclosed compartments. The composition of the soft actuator device includes the elastomeric precursor and the fibers. In one embodiment of the invention described more fully below, a wearable, assistive device for increasing the force a user can apply at his or her fingertips is fabricated and tested. The soft actuator device is removed from the cavity of the mold at step 212.

At step 214, the soft actuator device is activated. In one embodiment, the soft actuator device is activated pneumatically by supplying compressed air to the one or more integrated enclosed compartments. Air has low viscosity, and permits rapid actuation; since air is compressible, it is easy to store, light and environmentally benign. In one embodiment, a pneumatic system is used with air compressed at 7 to 28 kPa or 1-4 pounds per square inch gage (psig).

In one embodiment of the invention, a wearable, assistive device for increasing the force a user can apply at his or her fingertips is fabricated and tested as discussed more fully below. The rotational casted soft finger actuator device is capable of generating a force of 11 Newton (N) at its tip, a near ten-fold increase over similar actuator devices known in the art.

The material properties of exemplary elastomers used for certain embodiments of soft actuator devices according to the invention are shown in Table 1.

TABLE 1

| Rheological and Mechanical Properties of materials used | | | | |
|---|---|---|---|---|
| Material name | Initial viscosity [Pa · s] | 100% elastic moduli [kPa] | Ultimate strengths [MPa] | Ultimate elongation [%] |
| Ecoflex 00-30 | 3.35 | 39 | 0.77 | 665 |
| Ecoflex 00-50 | 6.15 | 65 | 1.2 | 799 |
| ELASTOSIL M4601 a/b | 7.38 | 455 | 4.39 | 759 |
| ELASTOSIL M4600 a/b | 16.18 | 543 | 4.04 | 620 |

Rheological properties (viscosity, elastic moduli, strength, elongation) of the materials were measured. Specifically, the initial viscosities were tested at oscillation strain rate of 1 s$^{-1}$ at 25° C., and the same strain rate and temperature were used for all the viscosities tested. Tensile tests were conducted on the cured material using standard ASTM D412: "Standard Test Methods for Vulcanized Rubber and Thermoplastic Elastomers—Tension".

Figure 3:
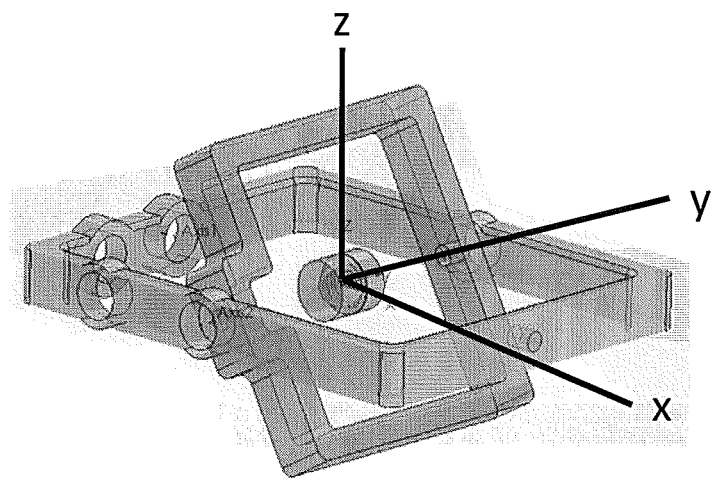
FIG. 3 is a perspective view of a rotational mold according to one embodiment of the invention.

FIG. 3 is a perspective view of a rotational mold 300 according to one embodiment of the invention. The axial speed ratio—rotational speed about x-axis to rotational speed about y-axis—was designed to be 47/36. The input rotational speed was a constant 6 revs/min. Once filled with an elastomeric precursor, the molds are rotated for a specified period of time, for example, a mold filled with Ecoflex 00-30 is rotated for 45 minutes. Then, the mold including elastomeric precursor (Ecoflex 00-30) is cured, for example, in an oven at 60° C. for 15 minutes. In another embodiment, ELASTOSIL M4601 a/b adding 15% of silicone thinner material is used to rotationally mold actuator devices. The input rotational speed is also a constant 6 revs/min. The mold is rotated for 3 hours and cured in an oven at 60° C. for 1 hour. However, as known to those skilled in the art, any material, rotational speed, duration of mold rotation and curing temperature and curing duration is contemplated.

According to the invention, rotational casting processes use a frame with two axes of rotation to fill the cavity of a hollow mold with thermoplastics. The rotational casting system developed for fabricating soft actuator devices uses materials that are liquid at room temperature and polymerize into soft elastomers during the casting process. Four parameters require tuning: (1) viscosity evolution during the casting process; (2) input rotational speed of the machine; (3) axial speed ratio of the machine; and (4) internal surface geometry of the mold.

Figure 4A:
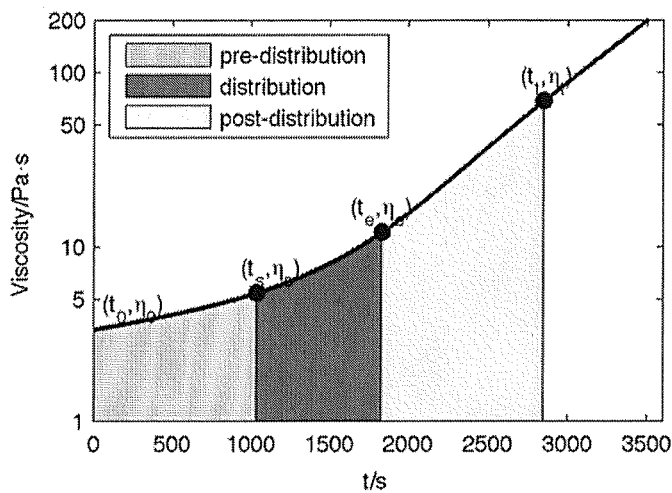
FIG. 4(a) is a graph illustrating viscosity revolution of an elastomeric precursor according to one embodiment of the invention.

FIG. 4(a) is a graph 410 illustrating viscosity revolution of an elastomeric precursor according to one embodiment of the invention. Specifically, the graph 410 shows the viscosity evolution of Ecoflex 00-30 at oscillation strain rate of 1 s$^{-1}$ at 25° C. during the curing process. There are four critical viscosities along the curve: $n_o$ is the "initial viscosity" defined as the degree of polymerization and crosslinking (DPC) when the material just starts to cure; $n_s$ is the "start viscosity" defined as the DPC when the material starts to distribute along the internal surface of the rotating mold; $n_e$ is the "end viscosity" defined as the DPC when the material stops to distribute along the internal surface of the rotating mold; $n_t$ is the "transfer viscosity" defined as the DPC when the material turns to solid state (G'>G").

"Pot life" defined as the period from $t_0$, at when viscosity is $n_o$ to $t_t$, when viscosity is $n_t$, could be divided into three periods, by $t_s$, at when viscosity is $n_s$ and $t_e$, at when viscosity is $n_e$: (i) pre-distribution, from $t_0$ to $t_s$, when the pre-elastomer is flowable and always flow to the bottom of the mold under gravity; (ii) distribution, from $t_s$ to $t_e$, when the speed of the pre-elastomer and that of the mold are comparable and the material is effectively distributed against the internal surface of mold after a certain amount of cycles; and (iii) post-distribution, from $t_e$ to $t_t$, when the pre-elastomer flows too slowly to be distributed against the mold no matter how many cycles the mold is rotated.

$n_o$ and $n_t$ can be easily achieved from rheological tests because they are only determined by the rheological property of the material. $n_s$ and $n_e$ are more complex as they are determined not only by the rheological property of the material, but also by the input rotational speed, wall thickness of the required part, etc. In certain experiments, the following results were achieved $n_s$=5.5 Pa·s and $n_e$=11.2 Pa·s of a mold 20 mm diameter rotated at 6 revs/min with a wall thickness of the actuator device at 5 mm.

Figure 4B:
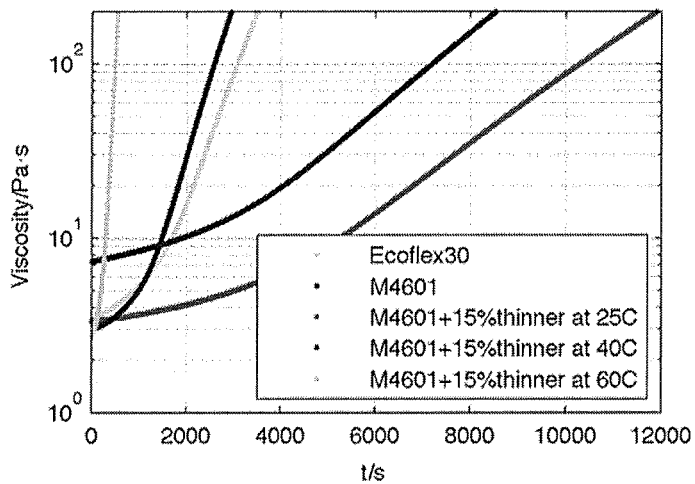
FIG. 4(b) is a graph illustrating viscosity evolution of various elastomeric precursors according to one embodiment of the invention.

FIG. 4(b) is a graph 420 illustrating viscosity evolution of various elastomeric precursors according to one embodiment of the invention. For other materials that have different viscosity evolutions of their pre-elastomers, a silicone thinner material is added to change the viscosity evolution. As shown in the graph 420 of FIG. 4(b), by adding 15% silicone thinner material to ELASTOSIL M4601 a/b, ELASTOSIL M4601 a/b, a stiffer silicone rubber than Ecoflex 00-30, achieved almost the same $n_o$ as Ecoflex 00-30. Temperature provides another tuning parameter to affect viscosity evolution of pre-elastomers, for example as shown in the same FIG. 4(b), by heating the pre-elastomers of ELASTOSIL M4601 a/b with 15% of silicone thinner material to 40° C., almost the same viscosity evolution is achieved for ELASTOSIL M4601 a/b as Ecoflex 00-30, which allows use of the same parameters like axial speed ratio, input rotational speed, mold design, rotating time to rotational mold ELASTOSIL M4601 a/b as Ecoflex 00-30. If not heated up, the same axial speed ratio, input rotational speed and mold design can be used, but the rotating time is longer than that for Ecoflex 00-30.

Figure 4C:
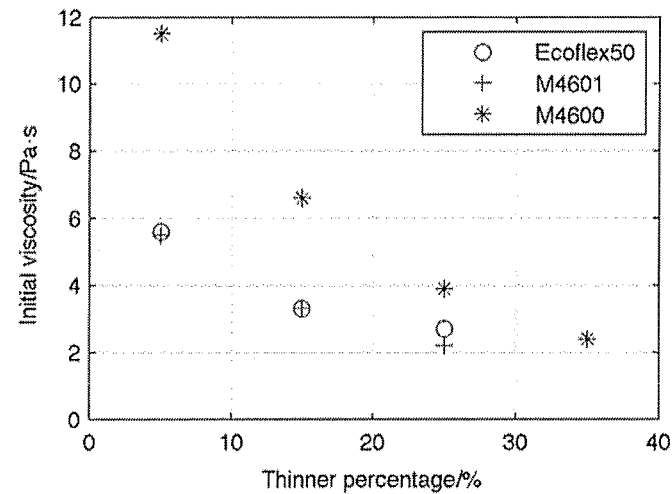
FIG. 4(c) is a graph illustrating thinner material percentage versus initial viscosity of an elastomeric precursor according to one embodiment of the invention.

FIG. 4(c) is a graph 430 illustrating thinner material percentage versus initial viscosity of an elastomeric precursor according to one embodiment of the invention. A necessary requirement for rotational casting of the pre-elastomers is $n_o < n_s$. Adding thinner could always decrease the initial viscosity as shown in the graph 430 of FIG. 4(c), for example, by adding 35% of silicone thinner material to ELASTOSIL M4601 a/b, $n_o$ decreases to 2.4 Pa·s. However, adding silicone thinner material also affects mechanical properties (for example, elastic modulus, ultimate strength and ultimate elongation) of the cured materials.

Pre-distribution is very important even though material is not distributed during this period. Usually, during this period, material is mixed and stirred to get rid of air bubbles, the material is loaded into the mold, the mold is fixed into the rotational machine, etc. Thus, the pre-distribution should be long enough to finish the above tasks. Distribution is critical to the consistency of the wall thickness. During the period, appropriately chosen input rotation speed and axial speed ratio ensures that wall thickness consistency is achieved. During post-distribution, even though material does not distribute any more while rotating, material is still in liquid state that could accumulate to the bottom of the mold if rotation stops. Therefore, the machine should also keep on rotating until the end of pot life.

Input rotational speed of the machine is another parameter that can be tuned to realize rotational casting because it can affect $n_s$ and $n_e$. Lower input rotational speed may increase the required $n_s$, which may increase the required $n_o$ to avoid using excessive amount of silicone thinner material. However, on one hand the effect of input rotational speed on $n_s$ is limited, on the other hand, decreasing input rotational speed may increase the rotating time.

Figure 5:
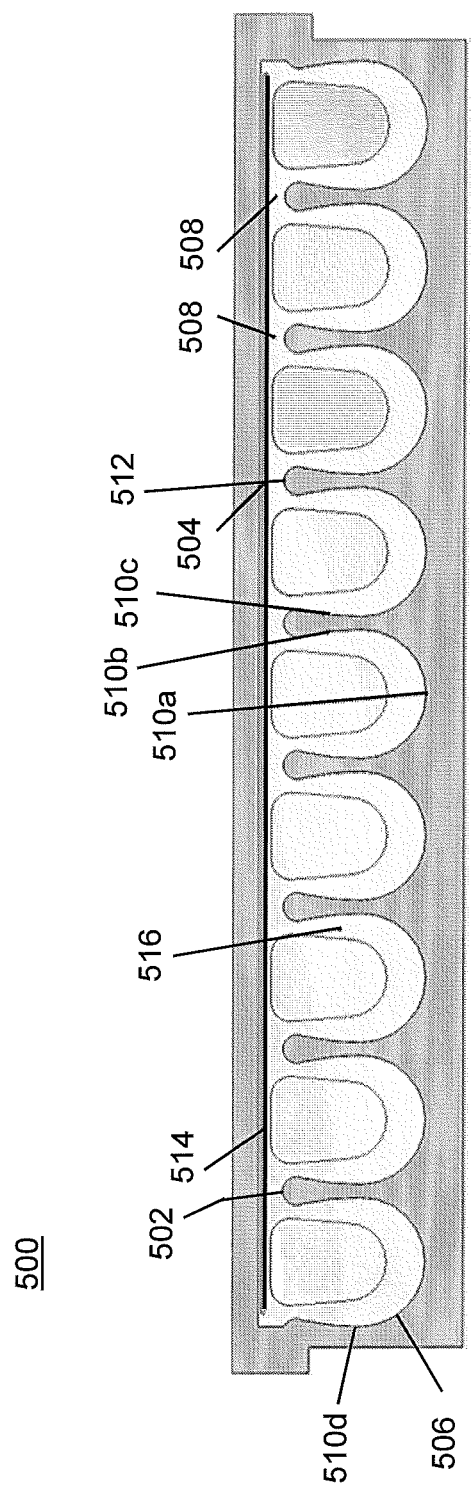
FIG. 5 is a profile view of the interior structure of a mold according to one embodiment of the invention.

For more complex actuator devices, mold design is critical for rotational casting soft actuator devices. FIG. 5 is a profile view of the interior structure of a mold 500 according to one embodiment of the invention. Specifically, the mold 500 is a wearable, assistive device for increasing the force a user can apply at his or her fingertips.

As shown in FIG. 5, the mold 500 includes connected interior structures 502 with a flat side 504 and a wavelike side 506. "Kiss-off" features 508 are an integral part of the pneumatic actuator device according to this embodiment of the invention. Concave mold features 510a, 510b, 510c, 510d tend to have more materials stick to them. Furthermore, the larger the curvature, the thicker the wall—for example, wall at mold feature 510a is thicker than those of 510b and 510c. On the contrary, the convex mold features 512 tend to have very thin walls. In order to overcome this problem, the distance between the flat side 504 and convex mold feature 512 is designed smaller than two times (usually one to one and a half times) of the average thickness of required part so that materials on concave mold feature 510a and the flat side 504 could "kiss off" to each other. This "kiss-off" feature is widely used in industrial rotational casting to increase the stiffness of the plastic parts. Here, these features are used to avoid generating thin covering of the convex mold features. Because of this feature, the rotational molded part is monolithic, composed of a series of the separate units connected by a common the flat side 504.

Before rotational casting, a layer of nylon fiber 514 is embedded on the flat side 504 of the mold 500 to form a strain-limiting layer. The elastomeric precursor 516 is added. During rotational casting, the material 516 distributes along the interior structures while rotating and cure to a monolithic part.

To apply pressured air to each of the unit of the actuator device, there should be an integrated enclosed compartment inside the actuator device. To realize this, a steel wire was inserted into the rotational molded actuator device. In certain embodiments, a coating layer may be sued to increase the stiffness of uninflated actuator devices and provide an interface with a user.

In testing the wearable, assistive device it was found that the rotational molded cuboid actuator devices made from ELASTOSIL M4601 a/b adding 15% of silicone thinner material generated a large stiffness when actuated with no obvious deformation with a 500 g-weight on its top. Performance of a bending actuator device is measured by its tip deflection, blocking force and equivalent moment or the combination such as maximum production of tip deflection and corresponding blocking force. The invention uses similar indices as tip force on one side of the actuator device and its curvature to characterize it. The reason curvature is used instead of tip deflection as an index is that curvature as a parameter can be directly applied for exoskeletons design, for example, a finger actuator device should be around 20 $m^{-1}$.

In the test set up, the actuator device was put on the ground, with a force sensor under one of the tips; a bezel was put over the top of the actuator device to constrain its height when actuated; different heights correspond to different curvature that the actuator device could produce. For each test, a height was chosen and fixed, then different pressures were applied while different tip forces were recorded.

Figure 6:
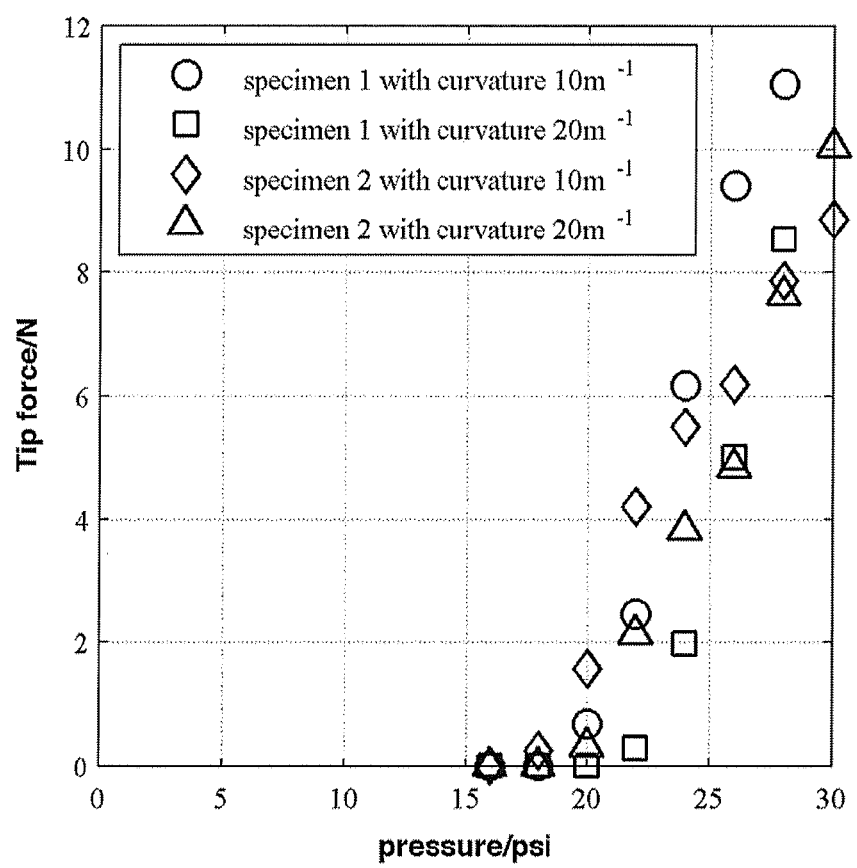
FIG. 6 is a graph illustrating tip force versus pressure of two specimens with two different curvatures according to one embodiment of the invention.

FIG. 6 is a graph 600 illustrating tip force versus pressure of two specimens with two different curvatures according to one embodiment of the invention. The two different specimens have the same dimensions as 15 mm×30 mm×150 mm but were manufactured in different runs. The graph 600 indicates: (1) tip force increases with applied pressure; (2) smaller curvature generates bigger tip force; (3) tip force is zero until pressure gets to a certain value; (4) curves of two specimens are very close indicating the consistency of rotational casting in manufacturing actuator devices of same dimensions in different cycles. The maximum pressure and maximum force of these rotational molded actuator devices are 30 psi and 11N, which exceeds pneumatic bending actuator devices of similar dimensions and materials made from replica casting.

Figure 7A:
FIG. 7(a) is an illustration of an uninflated finger actuator device according to one embodiment of the invention.
Figure 7B:
FIG. 7(b) is an illustration of an inflated finger actuator device according to one embodiment of the invention.

The soft robot in the form of a finger actuator device is shown in FIG. 7(a) and FIG. 7(b). As a wearable device, the finger actuator device is designed to be compliant to allow for unconstrained movement. In order to further reduce the rigidity of uninflated actuator device and demonstrate the scalability of rotational casting for soft actuator devices, a 6 mm-high monolith part is fabricated and coated to act as a finger actuator device as shown in FIG. 7(a) and FIG. 7(b). Specifically, FIG. 7(a) shows the finger actuator device in an uninflated state and FIG. 7(b) shows the finger actuator device inflated.

The finger actuator device is secured to a user's finger using three circular bands and a protrusion clamped with a hose clamp to minimize leaking. The dimension of the finger actuator device is 80 mm×15 mm×9 mm (not including the bands and the protrusion). It provides negligible resistance to the free movement of finger as shown in FIG. 7(a) and generates a force of 4N if inflated under the pressure of 21 psi and constrained the curvature to 20 $m^{-1}$ as shown in FIG. 7(b).

To demonstrate the utility and ease of use, a simple human-controlled finger actuator device system is used. The system consists of a finger actuator device, a pressure source, a solenoid valve, an electromyography (EMG) sensor and a microcontroller. The EMG is attached to the forearm at the location of muscles that control finger movements. Electrical impulses are detected by the EMGs, to open and close solenoid valves in line with the compressed air for actuating the finger actuator device. By reading the electrical activity of the muscle, muscle fatigue can be identified as well as the time when the muscle is contracting. At this time, the microcontroller activates the valve allowing for pressured air to actuate the finger actuator device, thus providing additional force for the user.

Figure 8:
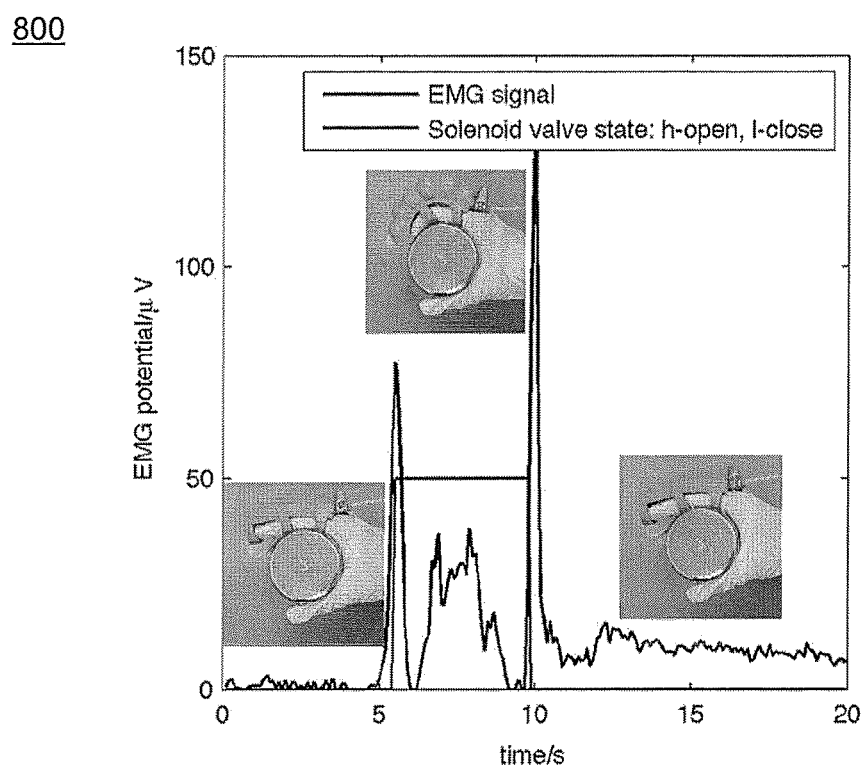
FIG. 8 is a graph illustrating EMG triggering of the finger actuator device according to one embodiment of the invention.

FIG. 8 is a graph 800 illustrating EMG triggering of the finger actuator device according to one embodiment of the invention. The graph 800 demonstrates the EMG signal change over time and the corresponding valve state as well as the finger actuator device movement. When the user's finger is at rest, EMG signal is low and the finger actuator device is uninflated; when the user attempts to pick up a 5-kg weight, the EMG signal increases until it reaches a threshold, the finger actuator device is rapidly inflated; to deflate the finger actuator device, the user pushes hard again to trigger another impulse of the EMG signal, which will then close the valve and deflate the finger actuator device. High force when inflated and low stiffness when unpressurized make the finger actuator device a great candidate for both exoskeleton and prosthetics. Furthermore, the invention provides the possibility of replacing human force, for example, by developing the finger actuator device into a full glove.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for making a soft actuator device, comprising the steps of:
   creating a mold including a base and a cavity;
   embedding fibers into the cavity of the mold prior to adding an elastomeric precursor into the cavity of the mold;
   adding the elastomeric precursor into the cavity of the mold having the embedded fibers therein;
   using rotational casting to disperse the elastomeric precursor within the cavity of the mold having the embedded fibers therein;
   constructing the soft actuator device including the elastomeric precursor and the fibers, the soft actuator device comprising one or more integrated enclosed compartments, wherein the soft actuator device is monolithic; and
   removing the soft actuator device from the cavity of the mold.

2. The method for making a soft actuator device according to claim 1, further comprising the step of activating pneumatically the soft actuator device including the step of supplying compressed air to the one or more integrated enclosed compartments.

3. The method for making a soft actuator device according to claim 1, wherein the elastomeric precursor is a urethane.

4. The method for making a soft actuator device according to claim 1, wherein the elastomeric precursor is a silicone.

5. The method for making a soft actuator device according to claim 1, wherein the fibers are nylon fibers.

6. The method for making a soft actuator device according to claim 1, wherein the soft actuator device is a finger actuator device.

7. The method for making a soft actuator device according to claim 1, wherein the soft actuator device is configured to withstand an inflation pressure greater than 30 psi without failing.

8. The method for making a soft actuator device according to claim 1, wherein the soft actuator device comprises a wall in a structural part, the wall including a curvature having a thickness thicker than an average thickness of the soft actuator device.

9. The method for making a soft actuator device according to claim 1, wherein the mold comprises a flat surface, a concave feature, and a convex feature.

10. The method for making a soft actuator device according to claim 1, wherein the thickness of the soft actuator device is not uniform.

11. The method for making a soft actuator device according to claim 1, wherein the soft actuator device is configured to withstand an inflation pressure between 30 psi and 50 psi without failing.

* * * * *